United States Patent [19]
Will

[11] Patent Number: 5,969,593
[45] Date of Patent: Oct. 19, 1999

[54] ANIMAL WARNING SYSTEM EMPLOYING ULTRASONIC SOUNDS AND INFRARED OR ULTRAVIOLET LIGHT FLASHES

[76] Inventor: George A. Will, Meadows Apts., Apt. 213 318 Dempsey Dr., Elburn, Ill. 60119-7007

[21] Appl. No.: 09/124,668

[22] Filed: Jul. 29, 1998

Related U.S. Application Data

[60] Provisional application No. 60/053,829, Jul. 29, 1997.

[51] Int. Cl.$^6$ .................................................. G08B 15/00
[52] U.S. Cl. .................. 340/384.2; 119/174; 119/719; 119/908; 362/253; 362/458; 362/487; 367/139; 340/573.2
[58] Field of Search ............................... 340/384.2, 573.2; 119/719, 174, 908; 367/139; 362/487, 253, 458

[56] References Cited

U.S. PATENT DOCUMENTS

| | | | |
|---|---|---|---|
| 3,516,384 | 6/1970 | Will | 340/384.2 |
| 5,602,523 | 2/1997 | Turchioe et al. | 340/384.2 |

*Primary Examiner*—Glen Swann
*Attorney, Agent, or Firm*—Lee, Mann, Smith, McWilliams, Sweeney & Ohlson

[57] ABSTRACT

A Warning system in combination with a vehicle in which ultrasonic sound and ultraviolet is beamed in advance of the moving vehicle on a thoroughfare so that said sound and light may be heard and seen by an animal ahead of the moving vehicle to induce the animal to leave the road before it is struck by the vehicle.

9 Claims, 1 Drawing Sheet

ANIMAL WARNING SYSTEM EMPLOYING ULTRASONIC SOUNDS AND INFRARED OR ULTRAVIOLET LIGHT FLASHES

This application depends from and claims the benefit of Provisional Patent Application Ser. No. 60/053,829, filed Jul. 29, 1997.

BACKGROUND OF THE INVENTION

It is not uncommon for cars and trucks to strike animals as they proceed along highways or other roads. Dogs and sometimes raccoons and other similar animals often chase moving vehicles and are frequently killed by colliding with the vehicle. In more heavily forested areas, larger animals such as deer and even moose, are even sometimes found on highways. Collisions with those animals are, of course, fatal to the animal and humans, and very damaging to the vehicle. This is, therefore, a serious problem for vehicle operators and it is a principal object of this invention to provide a Warning system employing ultrasonic sounds and infrared or ultraviolet light flashes to clear the road of animals.

In 1965, 48 states reported the adjusted national total of deer killed was 121,750, with a tabulated figure of human fatalities as 115 people killed, 1500 injured according to the National Safety Council. In 1965, the state of Illinois reported actual deer killed as 1,004. In 1995, the state of Illinois reported an actual vehicle-deer accident toll of 17,573. In 1995, all states reported 251 people killed, 3,010 injured, with 325,000 deer killed.

In my U.S. Pat. No. 3,516,384 issued Jun. 23, 1970 and incorporated herein by reference, I have disclosed a Warning system involving ultrasonic sounds which are inaudible to humans but may be perceived by animals and induce them to leave a highway or street. In an improvement on this invention, I have now incorporated ultrasonic light flashes which are also imperceptible to humans but may be seen by animals on the road.

SUMMARY OF THE INVENTION

This invention relates to a Warning system to be used in conjunction with an automotive vehicle such as a car or a truck to remove animals from thoroughfares such as highways, roads or the like. The device uses a combination of flashing infrared or ultraviolet light together with ultrasound, shotgun sounds and the like. Both the ultrasonic noise and the flashing black light would be heard and seen by animals but not by humans.

Upon placing the device on a vehicle during the daytime, the device is in an off position. The battery is in an off position but recharging itself As darkness sets in, the device must be turned on by a switch that will activate the system to begin its function.

The device will only begin the system as the vehicle goes in motion, then it emits the shotgun sounds and the light flashes together, simultaneously at set intervals from 3 to 4 times and then ceases, only to begin again together, simultaneously at set intervals from 3 to 4 times and then ceases, only to begin again together.

This "Animal Warning System" will continue only as desired by the operator, during the nighttime and darkness, while the vehicle is in motion or while parked in a remote area, until daytime or daylight appears. Then the device will automatically cease and shut-off.

The operator must then turn the main switch to the off position so the device can then allow the battery to recharge itself again.

DETAILED DESCRIPTION OF THE PREFERRED EMBODIMENTS

Figure 1:
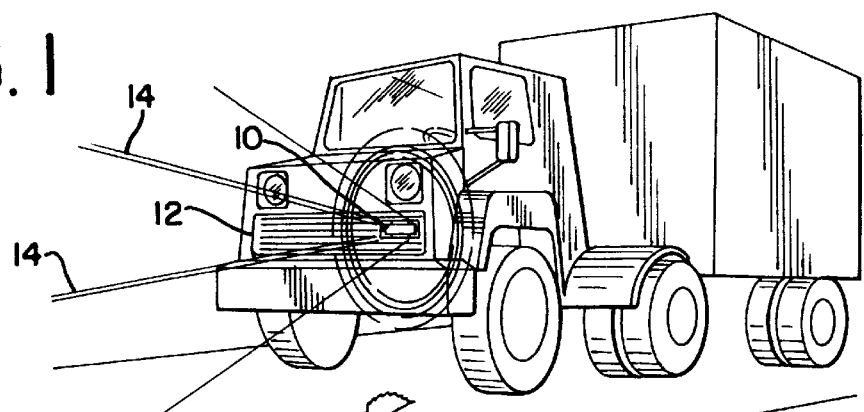
FIG. 1 is a perspective view of a truck vehicle equipped with a Warning system of this invention and showing an animal avoiding the vehicle.

The invention employs both sound and sight in order to provide the Warning for animals on highways, streets and the like. The sound is an ultrasonic sound which is preferably a shotgun blast at a frequency of between 21 and 23 kHz. The light portion of the Warning system is an infrared (or black light) of 6 to 8 watts which is pulsed to create 4 or 5 flashes at certain intervals. The frequency of the flashes can be adjusted by the operator or by the installer to suit conditions.

Ultrasonic sound generated by sources mounted on vehicles for scaring animals and other form of life on and along side highways in which the vehicle is traveling, have been in use for some years. Ultrasonic generating devices having sufficient power to be effective have been expensive and necessarily continuously operating while the vehicle is in motion. For a number of reasons, such continuity of operation is undesirable.

The present invention comprises a Warning system which includes the employment of ultrasonic sound but also includes an infrared or ultraviolet light which together simultaneously is detected by animals ahead of the vehicle along the highway. The hazards of collisions with animals exists mostly at night time driving. Accordingly, the device employs ultraviolet or infrared light beams projecting the necessary distance ahead of the vehicle for its operation.

The device known as the ultrasonic sound and the ultraviolet or infrared light which both then instantaneously begin to function, simultaneously together emitting ultrasonic sounds such as shotgun blasts and ultraviolet or infrared light bursts which will induce the impeding animal to react to the approaching danger and then leave the road. The device is also useful in connection with bird species as well as the animals, both of which will have the opportunity to be alerted to the eminent danger and leave the area.

The part of the Warning system known as the ultrasonic sounds and the ultraviolet or infrared light will be on only for seconds or long enough for the vehicle to have passed the collision point. It is then that this sound and light section of the device shuts off and then the ultrasound and ultraviolet turns on again and begins emitting for warning any living image life form.

The whole ultrasonic infrared Warning system can be completely turned off either automatically or by the operator in daylight hours.

Research conducted in connection with this device shows that it will Warn animals, birds and even insects of approaching danger on thoroughfares. Use of sound alone is not completely satisfactory in connection with animals such as deer. However, when the flashing light is added, the effectiveness is substantially upgraded to almost 100%. Dogs, foxes, coyotes, sheep and geese are also effected in a similar fashion.

The sound must be presented to an animal long enough for it to develop a sense of anxiety although a brief sound such as from a shotgun, can be effective. Birds may adapt to a stationary area once the startled reaction is gone. Mobile sounds are different and are more difficult to adapt to.

Sound duration must be long enough to cover the approach of some hypothetical animal or bird, 6 to 10 seconds may suffice. This should be repeated every so often but not more frequently than once ever 20 or 30 seconds if sound is stationary.

There is positive evidence that the important power measure in a sound that occurs in bursts is the peak power rather than the average power provided that bursts are not too short, i.e., not less than 0.05 seconds. If a sound turns on/off several times per second with say 60% on time, peak power of 3 watts per acre, becomes only 1.8 watts average power. The most efficient stationary sounds appear to be those that burst on and off at a rate of several times per second with this bursting sequence lasting for 6 to 10 seconds.

Upon hearing the sound together with simultaneously seeing the ultraviolet or infrared light, a definite stimuli is provided which causes immediate early responses of danger in animals. Using the shotgun sounds of around 23 kHz along with 102 to 110 decibel sound level, to 3 feet to 10 feet, seems to be sufficient. Sound is obtained by recording a shotgun blast at the lowest possible speed of about 3.75 inches per second (ips). To raise the frequency, it can be played back at double speed. Of course, there are other ways of providing the shotgun blast sounds.

Referring now to the drawings, in FIG. 1 there is shown a perspective view showing a truck including the Warning device 10 of this invention. As can be seen, the device is located on the front grill 12 of the truck and it radiates its sound and light in the direction shown by the lines 14 so that the animal shown in the figure, namely, a deer, would move away from the path of the approaching truck.

Figure 2:
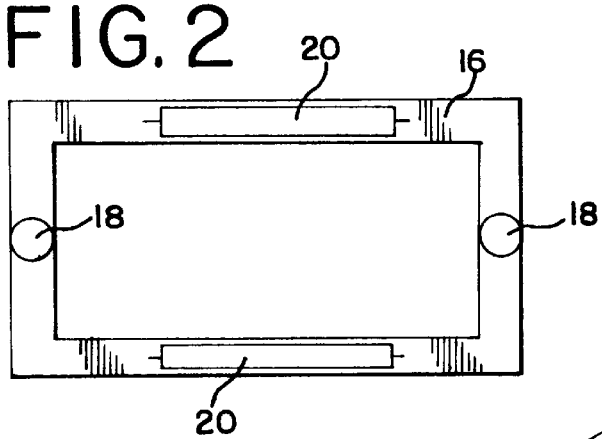
FIG. 2 is a front view of a license plate holder including the Warning system of this invention.
Figure 4:
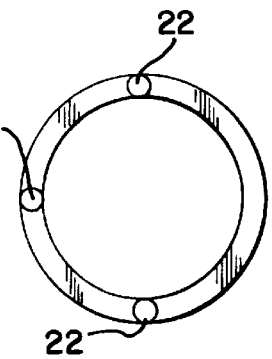
FIG. 4 is a front view of an alternate construction of the Warning system of this invention using a headlight bracket.

The Warning device 10 is shown more particularly in FIG. 2 as located in a license plate holder 16. The ultraviolet bulbs 18 and the transducers 20 are so located and designed to project their forces and sounds forward. There are many other places that these concepts can be employed. In FIG. 4 there is shown a headlight bracket which would include transducers and bulbs 22. Such units can also be installed in radiators, hood ornaments and as far as aircraft are concerned, in the lower part of a jet engine. However, the Warning system fits very conveniently into and is incorporated into a license plate holder as shown.

Figure 3:
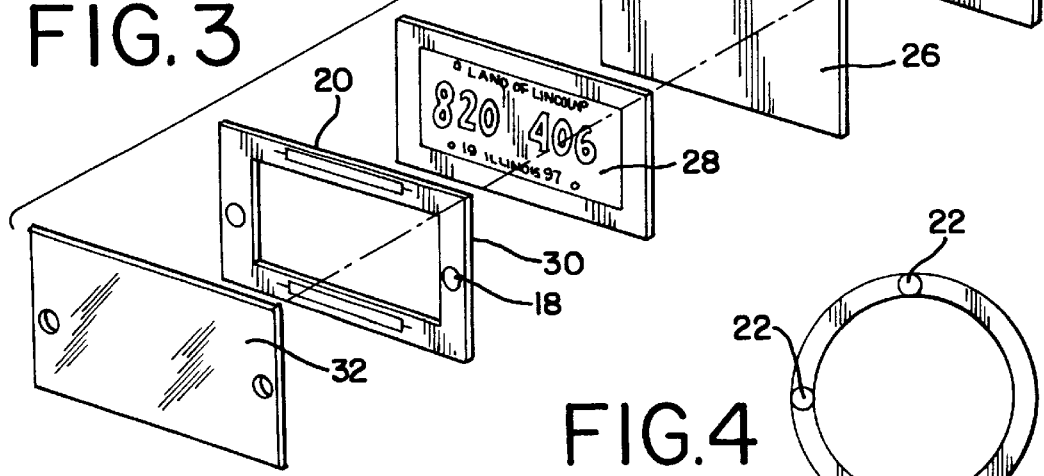
FIG. 3 is an exploded view of the license plate holder of FIG. 2 showing the various components of the Warning system of this invention.

Referring now to the exploded view in FIG. 3, it can be seen that the unit includes a rechargeable battery 24, an electronic digital board 26 which provides the sounds, preferably shotgun sounds as is well known in the art. The license plate itself 28, the license plate holder 30 which includes the bulbs 18 and the transducer 20 and lastly the plastic cover 32 for covering the entire unit. The battery pack 24 is rechargeable and would be recharged when the unit is turned off, normally during the daytime. The electronic digital board 26 provides the shotgun sounds at roughly 19–23 kHz at from 110 to 80 dbs at about 3–10 feet. It is connected to an on/off switch (not shown) so that it may be turned off during the day time and is used only at night and intermittently. As already mentioned, ultrasound has been proven to repel many animals, birds, insects and the like. The transducers 20 pass on the shot gun sounds from the electronic digital board 26. The ultraviolet bulbs 18 are approximately 6–8 watt bulbs providing flashes intermittently with the sounds from the transducers 20. Such a construction has been proven to attract many insects and the like so that the intermittent sounds can be effective.

Referring again to the drawings, FIG. 3 shows the battery which is a 12 volt rechargeable high current battery pack. A shotgun sound recording at 19 to 23 kHz, 110 to 180 dbs at 3 to 10 feet which is an on/off signal at night only intermittently transmitted. As already stated, the ultrasound has been proven to repel many animals, birds and insects. This concept is inserted along with a license plate into a license plate holder which includes ultraviolet bulbs 18 of 6 to 8 watts which flash intermittently on and off along with the sounds. Such light has been proven to eliminate many animals. The combination of the sound and light is almost 100% effective in eliminating animals and birds and the like from the highway, as can be seen in FIG. 1. The ultraviolet bulbs and the speaker transducers are incorporated into the license plate holder but as already mentioned and as is shown in FIG. 4, there are many other places that these concepts can be employed.

In a more specific description, the ultrasonic shotgun blasts are recorded and measured on an oscilloscope and then transferred onto high frequency tape without changing characteristics or distortion of the sound pattern. The sound is then broadcast through high frequency transducer speakers 20 at 19–23 kHz from 3 feet to 20 feet distance with 110 dbs sound level down to 80 dbs sound level. Other high frequency sounds have effectively been used in field tests and in the laboratory on moths, insects, animals and birds. However, it would appear that the shotgun blast sound is the most effective. The use of sophisticated transducers is desirable in order to achieve effective results ultrasonically with high frequencies.

Ultraviolet or infrared light flashes synchronized together with ultrasonic shotgun blasts simultaneously at 4 or more or less intervals only to begin again are the most effective. The ultraviolet light gives out a purplish glow in color. Ultraviolet light has many rainbow combinations of colors which have been successfully used to attract insects and animals.

An exterior switch (not shown) controls operation of the device which is controlled by light sensors (not shown) whereby the device will be used only upon darkness. It will go on when darkness arrives and will shut off when daylight appears.

This ultraviolet or infrared light's primary purpose is to attract animals or birds toward the direction from which it is coming while they instantly hear the Warning sound of danger as the shotgun blasts are broadcast and as the vehicle approaches on a thoroughfare, thereby providing a reactional response between the vehicle and the animal, bird or the like to avoid the danger. Ultraviolet and infrared spectrum provides an image formed by rays of light in which parts of the spectrum—red, white, orange, yellow, green, blue and violet hues of colors—are arranged according to their refrangibility or wavelength, thereby forming a band. The seven colors of the rainbow. These colors form the radiant energy that acts on the retina of the eye and renders visible the objects from where it comes.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. In combination with a vehicle having a power source, a warning system to induce animals to leave the thoroughfare on which the vehicle is traveling comprising:

sound generating means for producing sound of a frequency above the range audible to persons and within the ultrasonic range audible to animals, said means being mounted on said vehicle in a position to project said sound ahead of said vehicle;

light generating means for producing infrared or ultraviolet light visible to animals but not to humans, said means being also being mounted on said vehicle in a position to project said light ahead of said vehicle; and means connecting said device to said source to selectively activate said device.

2. A Warning system as set forth in claim 1 wherein said sound generating means includes a transducer.

3. A Warning system as set forth in claim 1, wherein said light generating means includes an ultraviolet bulb.

4. A Warning system as in claim 3, wherein said generating means includes an electrical ultrasonic frequency signal generator connected to said transducer to deliver ultrasonic electrical impulses to the transducer which is adapted to emit the ultrasonic sounds, and said connecting means includes control switch means for connecting said generator to the power source to operate the same.

5. A Warning system as set forth in claim 1 wherein said sound generating means includes a transducer and said light generating means includes an ultraviolet light bulb.

6. A Warning system as set forth in claim 5 wherein said sound generating transducer emits shotgun sounds at around 23 kHz with 102–110 decibel sound level to 3–10 feet and said ultraviolet light bulb is approximately a 6–8 watt bulb proving flashes intermittently.

7. The method of protecting an automotive vehicle against collision with animals on the thoroughfare along which the vehicle is traveling, said method including the steps of generating and projecting a beam of ultrasonic sound, substantially free of sonic sound and ultraviolet light.

8. The method as set forth in claim 7 wherein said beam is confined to substantially the width of the thoroughfare.

9. The method as set forth in claim 7 wherein said beam is projected intermittently as the vehicle proceeds along the thoroughfare.

* * * * *